April 5, 1949.    A. B. MINDLER    2,466,662
OPERATION OF ION EXCHANGE BEDS
Filed April 22, 1947
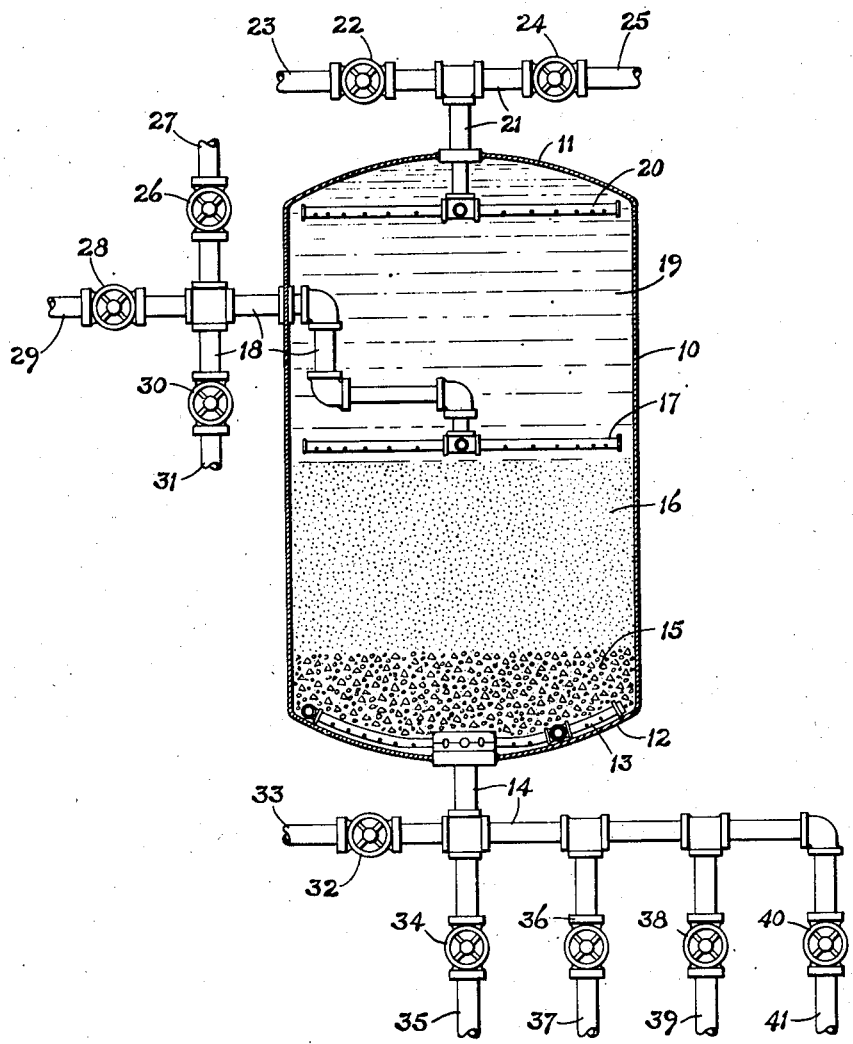
ALBERT B. MINDLER
INVENTOR.
BY Patented Apr. 5, 1949

2,466,662

UNITED STATES PATENT OFFICE 2,466,662

OPERATION OF ION EXCHANGE BEDS

Albert B. Mindler, Yardley, Pa., assignor to The Permutit Company, New York, N. Y., a corporation of Delaware Application April 22, 1947, Serial No. 743,065

3 Claims. (Cl. 127—46)

This invention relates to a cyclic process of treating an aqueous solution having a specific gravity substantially higher than that of water by passage through a bed of ion exchange material, all as more fully described and as claimed hereinafter.

Ion exchange materials have come into wide use for the treatment of aqueous solutions. Such materials may be cation exchange materials, usually having sodium or hydrogen as the exchangeable cation, or anion exchange materials having hydroxyl as the exchangeable anion. On passing an aqueous solution containing dissolved salts through cation exchange material, the metallic cations in the solution are exchanged for sodium or hydrogen, thus transforming the dissolved salts to sodium salts or mineral acids, respectively. When employing a cation exchanger charged with hydrogen ions, the acid effluent may subsequently be passed through an anion exchange bed, whereby the sulfates, chlorides, etc., are exchanged for hydroxyl ions so that the acidity of the solution is removed.

After such ion exchange materials have exchanged substantially all the ions with which they have been originally charged, their capacity for further exchange becomes exhausted and they must be regenerated for further use. The regeneration in the case of cation exchangers consists of treating the bed with a solution of sodium chloride or a strong mineral acid, depending on whether it is used in the sodium cycle or the hydrogen cycle. The regeneration of the anion exchange material is carried out by treating the bed with an alkali such as sodium hydroxide, sodium carbonate, ammonium hydroxide etc. It is customary to remove accumulated solid impurities from each bed just prior to regeneration by an upward flow of water, termed backwashing, which cleanses and regrades the bed of ion exchange material. After treatment with the regenerant the bed is rinsed free of spent and excess regenerant by a flow of water to waste, termed rinsing. The steps of backwashing, introducing regenerant, and rinsing the bed are usually referred to as the regenerating cycle, and it is to be noted that modifications of such regenerating cycle as to number and sequence of the individual steps are well known in the art.

When treating water with ion exchangers there is no problem in going from the service step to the regenerating cycle and from the regenerating cycle back to the service step because raw water such as that undergoing treatment, is usually used in carrying out the various steps of the regenerating cycle.

When treating solutions other than water, however, such as sugar-bearing liquids, there is a problem. In such cases, it is customary to use water in carrying out the regenerating cycle, and the problem is to remove the solution from the tank containing the ion exchange material prior to regeneration, and to remove the water from such tank at the end of the regenerating cycle and prior to resuming treatment of the solution, without diluting the solution undergoing treatment with water to an appreciable degree. In the treatment of sugar-bearing liquids these operations are referred to as "sweetening-on" and "sweetening-off." In treating such sugar-bearing liquids it has been the previous practice to drain the water above the bed of ion exchange material to a level a few inches above the bed before sweetening-on. Especially when the treatment is carried out in a closed tank, this requires the use of compressed air and considerable equipment and control devices for effecting the necessary operations, controlling the flow of air and controlling the liquid level in the tank.

It is the object of this invention to provide a simpler, more efficient and more expeditious cyclic process of treating a solution having a specific gravity substantially higher than that of water by passage through a bed of ion exchange material.

The appended drawing is a diagrammatic showing of a tank containing a bed of ion exchange material and provided with the necessary valves and connections for carrying out the process according to my invention.

Referring to the drawing, the tank 10 has a top head 11 and a bottom head 12. Within the tank and adjacent to the bottom 12 is a distributor 13 connected to a header 14. The distributor 13 is covered by a layer 15 of gravel or other coarse granular material suitable for supporting the bed 16 of ion exchange material. At a short distance above the top of the bed 16 is a distributor 17 connected to a header 18. Above the level of the distributor 17 and filling the entire upper portion of the tank is a body of water 19 which, during normal treating operation, is stagnant. Adjacent to the top head 11 is a distributor 20 connected with a header 21.

The header 21 is connected through a valve 22 with a water inlet 23 and through a valve 24 with a wash water outlet 25. The header 18 is connected through a valve 26 with an inlet 27 for solution to be treated, through a valve 28 with a regenerant inlet 29, and through a valve 30 with a water inlet 31. The header 14 is connected through a valve 32 with a wash water inlet 33, through a valve 34 with a waste liquid outlet 35, through a valve 36 with a treated solution outlet 37, through a valve 38 with an untreated solution outlet 39, and through a valve 40 with a dilute solution outlet 41.

The operation of the apparatus shown in the drawing will now be described with particular reference, by way of example, to the treatment of a sugar-bearing solution or juice which, because of its sugar content, has a specific gravity substantially higher than that of water, i. e. from about 1.03 to 1.10.

In normal operation, the solution to be treated is admitted through inlet 27, open valve 26, header 18 and distributor 17 to the tank directly above the top of the bed of ion exchange material 16 and below the stagnant body of water 19. The solution flows downwardly through the bed 16, whereby the exchange of cations or anions, depending upon which type of bed is used, takes place, then through the gravel 15 and out through the distributor 13, the header 14, open valve 36 and outlet 37 to a point of use. All valves other than 26 and 36 are closed during this operation.

I have made the surprising discovery that there is no intermingling of any consequence between the relatively heavy solution introduced through the distributor 17 and the stagnant body 19 of relatively lighter water above such solution except in a very narrow layer above the distributor 17, where a small amount of sugar-bearing solution gradually diffuses into the lowermost portion of the stagnant body 19. When the treating step is prolonged, such sugar-bearing solution diffusing in the lowermost portion of the stagnant body 19 may be objectionable because in the course of time, fermentation may set in. Such fermentation can be prevented, if desired, by periodically, that is to say at intervals of one or several hours, opening valve 22 for a brief interval of time so as to admit a small amount of water through inlet 23, valve 22, header 21 and distributor 20 into the uppermost portion of the stagnant body 19, expanding it and forcing the diffusion layer downward into the bed 16 of ion exchange material, thereby, for a short interval, slightly diluting the incoming solution to be treated.

When the limit of capacity of the ion exchange material 16 has been reached, the introduction of solution through inlet 27 is interrupted by closing valve 26. Valve 22 is opened to admit water into the stagnant body 19 without substantial disturbance thereof, since the water is evenly admitted through the distributor 20. The body 19 is thereby expanded, forcing the solution within the bed 16 downward as under the action of a piston. So long as the solution leaving the tank through distributor 13 and header 14 is satisfactorily treated, it is discharged through the open valve 36 and the treated solution outlet 37. When the solution leaving the tank is no longer satisfactorily treated, valve 36 is closed and valve 38 is opened so that the solution is discharged through the outlet 39 for further treatment in another unit of similar type, or for subsequent treatment in the same unit. When the body 19 of water has expanded to a point where it fills nearly the entire tank, the solution flowing through distributor 13 into header 14 will become more and more dilute and its specific gravity will drop, approaching that of water. When a predetermined low specific gravity has been reached, valve 38 is closed and valve 40 opened so as to discharge such dilute solution through outlet 41 for further use, but this is an optional refinement not necessarily employed.

When the specific gravity of solution discharged from the tank through distributor 13 into header 14 has reached a value so low that its recovery is no longer economical, valves 22 and 40 (or valves 22 and 38 if the previously mentioned optional step was omitted) are closed, the sweetening-off operation having thus been completed.

The ion exchange material is now regenerated, by a cycle of operations comprising First: Backwashing, effected by opening valves 24 and 32 so that water flows through inlet 33, valve 32, header 14, distributor 13, gravel 15, upwardly through the bed 16, thereby expanding, cleansing, and regrading it, then through the distributor 20, header 21, valve 24 and outlet 25 to waste. When the bed has thus been satisfactorily cleansed as indicated by the disappearance of turbidity in the water flowing from outlet 25, valves 24 and 32 are closed.

Second: Introducing the regenerant, effected by opening valves 28 and 34 so that regenerant flows through inlet 29, valve 28, header 18, distributor 17, downward through the bed 16 of ion exchange material, gravel 15, distributor 13, header 14, valve 34 and outlet 35 to waste. This flow is continued until a quantity of regenerant solution has been introduced sufficient to restore the ion exchange capacity to bed 16. Then valves 28 and 34 are closed.

Third: Rinsing, effected by opening valves 22 and 30 so that water is introduced through both distributors 20 and 17 to flow downwardly through the bed 16 to waste through outlet 35, rinsing the bed free of excess and spent regenerant. After a brief interval of time, sufficient to displace any regenerant remaining in header 18 and distributor 17, valve 30 may be closed so that the rinsing operation is continued by the flow of water admitted through inlet 23 and distributor 20. When all spent and excess regenerant has been rinsed from the tank, valve 22 is closed.

The sweetening-on operation is now initiated by opening valve 26 so that the raw solution to be treated is admitted through inlet 27, valve 26, header 18 and distributor 17, flowing below the now stagnant body of water 19 downwardly into the bed 16 and displacing therefrom the remaining rinse water. This sweetening-on operation is continued until treated solution appears in the header 14, whereupon valve 34 is closed and valve 36 opened so that the treated solution is discharged through outlet 37. Thus, the normal operating condition, initially described, again prevails.

This cycle of operations may be repeated over and over.

While this method of operation has particular advantage in the treatment of sugar-bearing solutions it may, of course, be used in an analogous treatment of any other aqueous solution having a specific gravity substantially higher than that of water.

I have described my method as carried out under pressure in a closed tank, but it may, if desired, also be carried out in an open tank of what is generally referred to as "gravity type."

While I have described what I consider the most advantageous way of practicing my invention, modifications may, of course, be made without departing from the spirit of my invention and reference is, therefore, made to the appended claims for a definition of the scope of my invention.

What I claim is:

1. A cyclic process of treating an aqueous solution having a specific gravity substantially higher than that of water by passage through a bed of ion exchange material which comprises the steps of (a) Introducing said solution between the top of said bed and a superimposed stagnant body of water, flowing said solution downwardly through said bed and withdrawing said solution after treatment thereof from the bottom of said bed to a point of use; (b) Interrupting said introduction of said solution and introducing water into said body of water without substantial disturbance thereof, so as to expand said body and thereby force solution within said bed downward and from the bottom of said bed to a point of use; (c) Reconditioning said bed by a cycle of operations comprising an upward flow of backwash water to a point of disposal and a flow of regenerant solution and rinse water to a point of disposal; (d) Introducing said solution at a short distance above the top of said bed and below a stagnant body of water to force rinse water remaining in said bed from the bottom of said bed to a point of disposal; and (e) Resuming step (a) when the specific gravity of said solution flowing after treatment thereof from the bottom of said bed has risen to a predetermined high value.

2. The process of claim 1 in which small amounts of water are periodically introduced into the stagnant body of water during step (a) to expand the same and displace the lowermost layer thereof into the liquid being introduced.

3. A cyclic process of treating an aqueous solution having a specific gravity substantially higher than that of water by passage through a bed of ion exchange material which comprises the steps of (a) Introducing said solution between the top of said bed and a superimposed stagnant body of water, flowing said solution downwardly through said bed and withdrawing said solution after treatment thereof from the bottom of said bed to a point of use; (b) Interrupting said introduction of said solution and introducing water into said body of water without substantial disturbance thereof, so as to expand said body and thereby force solution within said bed downward and from the bottom of said bed to a point of use; (c) Diverting the flow of said solution from the bottom of said bed to a point of disposal when the specific gravity of said solution has fallen to a predetermined low value; (d) Reconditioning said bed by a cycle of operations comprising an upward flow of backwash water to a point of disposal and a flow of regenerant solution and rinse water to a point of disposal; (e) Introducing said solution at a short distance above the top of said bed and below a stagnant body of water to force rinse water remaining in said bed from the bottom of said bed to a point of disposal; and (f) Resuming step (a) when the specific gravity of said solution flowing after treatment thereof from the bottom of said bed has risen to a predetermined high value.

ALBERT B. MINDLER.

REFERENCES CITED

The following references are of record in the file of this patent:

UNITED STATES PATENTS

| Number | Name | Date |
|---|---|---|
| 1,255,359 | Uecke | Feb. 5, 1918 |
| 1,942,807 | Dotterweich | Jan. 9, 1934 |
| 1,976,439 | Dotterweich | Oct. 9, 1934 |
| 2,092,716 | Hungerford et al. | Sept. 7, 1937 |
| 2,351,835 | Pick | June 20, 1944 |
| 2,365,221 | Shafor | Dec. 19, 1944 |